(12) United States Patent
Gierszewski et al.

(10) Patent No.: US 8,281,570 B2
(45) Date of Patent: Oct. 9, 2012

(54) REDUCING AGENT INJECTOR HAVING PURGE HEATER

(75) Inventors: John D. Gierszewski, Creve Coeur, IL (US); Glenn B. Cox, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 442 days.

(21) Appl. No.: 11/889,166

(22) Filed: Aug. 9, 2007

(65) Prior Publication Data
US 2009/0038299 A1 Feb. 12, 2009

(51) Int. Cl.
*F01N 3/00* (2006.01)
(52) U.S. Cl. ........... 60/286; 60/274; 60/277; 60/295; 60/303
(58) Field of Classification Search ............ 60/274, 60/277, 286, 295, 303, 324, 276
See application file for complete search history.

(56) References Cited

U.S. PATENT DOCUMENTS

| | | | |
|---|---|---|---|
| 4,280,659 A | 7/1981 | Gaal et al. | |
| 4,533,316 A | 8/1985 | Takino et al. | |
| 5,353,591 A * | 10/1994 | Kabasin et al. | 60/274 |
| 5,605,042 A * | 2/1997 | Stutzenberger | 60/286 |
| 5,758,826 A | 6/1998 | Nines | |
| 5,884,475 A * | 3/1999 | Hofmann et al. | 60/274 |
| 6,109,247 A | 8/2000 | Hunt | |
| 6,192,677 B1 * | 2/2001 | Tost | 60/286 |
| 6,279,549 B1 | 8/2001 | Hunt et al. | |
| 6,332,457 B1 | 12/2001 | Imoehl | |
| 6,470,673 B1 * | 10/2002 | van Nieuwstadt et al. | 60/274 |
| 6,526,746 B1 * | 3/2003 | Wu | 60/286 |
| 6,779,513 B2 | 8/2004 | Pellizzari et al. | |
| 6,913,004 B2 | 7/2005 | Pellizzari et al. | |
| 6,913,005 B2 | 7/2005 | Linna et al. | |
| 6,928,807 B2 | 8/2005 | Jacob et al. | |
| 7,032,576 B2 | 4/2006 | Linna et al. | |
| 7,059,307 B2 | 6/2006 | Pellizzari et al. | |
| 7,137,383 B2 | 11/2006 | Linna et al. | |
| 7,500,356 B2 * | 3/2009 | Hirata et al. | 60/286 |
| 7,571,599 B2 * | 8/2009 | Hirata | 60/286 |
| 7,614,213 B2 * | 11/2009 | Hirata et al. | 60/286 |
| 7,958,721 B2 * | 6/2011 | Craig et al. | 60/286 |
| 2003/0180674 A1 | 9/2003 | Pellizzari | |
| 2006/0156733 A1 | 7/2006 | Prociw et al. | |
| 2006/0191254 A1 | 8/2006 | Bui et al. | |
| 2006/0233689 A1 | 10/2006 | Hirata et al. | |
| 2007/0044453 A1 | 3/2007 | Strauser et al. | |
| 2007/0048204 A1 | 3/2007 | Mital | |
| 2007/0080239 A1 | 4/2007 | Yasukawa et al. | |
| 2007/0240405 A1 * | 10/2007 | Nishina et al. | 60/286 |

FOREIGN PATENT DOCUMENTS

| | | |
|---|---|---|
| DE | 198 55 385 A1 | 6/2000 |
| WO | WO 00/32914 | 6/2000 |
| WO | 2005025725 | 3/2005 |
| WO | WO 2005/028827 A1 * | 3/2005 |
| WO | 2007137897 | 12/2007 |

* cited by examiner

*Primary Examiner* — Binh Q Tran
(74) *Attorney, Agent, or Firm* — Finnegan, Henderson, Farabow, Garrett & Dunner LLP

(57) ABSTRACT

A method of introducing a reducing agent into an exhaust stream may include injecting the reducing agent into the exhaust gas stream using a reducing agent injector. The method may further include selectively heating a nozzle of the reducing agent injector to reduce residue on the nozzle.

15 Claims, 2 Drawing Sheets

REDUCING AGENT INJECTOR HAVING PURGE HEATER

TECHNICAL FIELD

The present disclosure is directed to a fluid injector and, more particularly, to a heated nozzle fluid injector system.

BACKGROUND

Engines, including diesel engines, gasoline engines, gaseous fuel powered engines, and other engines known in the art, may exhaust a complex mixture of air pollutants. These air pollutants may include oxides of nitrogen ($NO_x$). Due to increased attention on the environment, exhaust emission standards have become more stringent. The amount of $NO_x$ emitted from an engine may be regulated depending on the type of the engine, the size of the engine, and/or the class of the engine.

One method implemented by engine manufacturers to comply with emissions regulations has been to reduce $NO_x$ levels in engine exhaust using a process called selective catalytic reduction (SCR). In SCR, a gaseous or aqueous reducing agent may be added to the exhaust gas of an engine. The mixture may be absorbed onto a catalyst. The reducing agent may react with $NO_x$ in the exhaust gas to form water and nitrogen gas.

In order to help promote mixing between the reducing agent and the exhaust gas, the reducing agent may be introduced into the exhaust gas by a reducing agent injector. The reducing agent injector may include a nozzle that extends into the flow path of the exhaust gas. The reducing agent may be sprayed into the exhaust gas using the nozzle, allowing the reducing agent and the exhaust gas to mix, which may help to encourage the reduction reaction. However, over time, debris may form on or in the nozzle, causing the nozzle to clog. If the nozzle becomes clogged, it may be difficult or impossible to introduce the reducing agent into the exhaust gas, and may eventually prevent SCR from taking place.

One method for purging an injector is described in U.S. Pat. No. 6,913,005 to Linna et al. ("Linna"). Linna discloses an injector including a capillary flow passage, and a heat source arranged along the capillary flow passage to heat a liquid therein. The heat applied is sufficient to convert a portion of the liquid from the liquid state to a vapor state. The portion of liquid fuel to be converted to the vapor state is controlled to achieve minimal exhaust emissions. The vaporized fuel can be supplied to a combustion chamber of an internal combustion engine during cold-start and warm-up of the engine and reduced emissions may be achieved. However, the injector in Linna is used for fuel injection, rather than for reducing agent injection. Further, the heat source in Linna is adapted for vaporizing liquid fuel, and is not disclosed as being capable of burning off solid residue that may be clogging the injector.

The system and method of the present disclosure solves one or more of the problems set forth above.

SUMMARY OF THE INVENTION

In one aspect, the presently disclosed embodiments may be directed to a method of introducing a reducing agent into an exhaust stream. The method may include injecting the reducing agent into the exhaust gas stream using a reducing agent injector. The method may also include selectively heating a nozzle of the reducing agent injector to reduce residue on the nozzle.

In another aspect, the presently disclosed embodiments may be directed to a method for cleaning residue from a reducing agent injector of an aftertreatment system. The method may include monitoring the aftertreatment system for a triggering condition indicative of the presence of residue interfering with the injection of reducing agent by the reducing agent injector. The method may also include activating a heater when the triggering condition is sensed. The method may further include heating a nozzle of the reducing agent injector with the heater to remove residue from the nozzle.

In yet another aspect, the presently disclosed embodiments may be directed to a system for performing selective catalytic reduction. The system may include a reducing agent injector configured to inject a reducing agent into exhaust in an exhaust passage. The system may also include a heater coupled to a nozzle of the reducing agent injector. The system may further include a catalyst configured to receive the mixture of reducing agent and exhaust from the exhaust passage. The system may further include a controller coupled to the heater.

DETAILED DESCRIPTION

Figure 1:
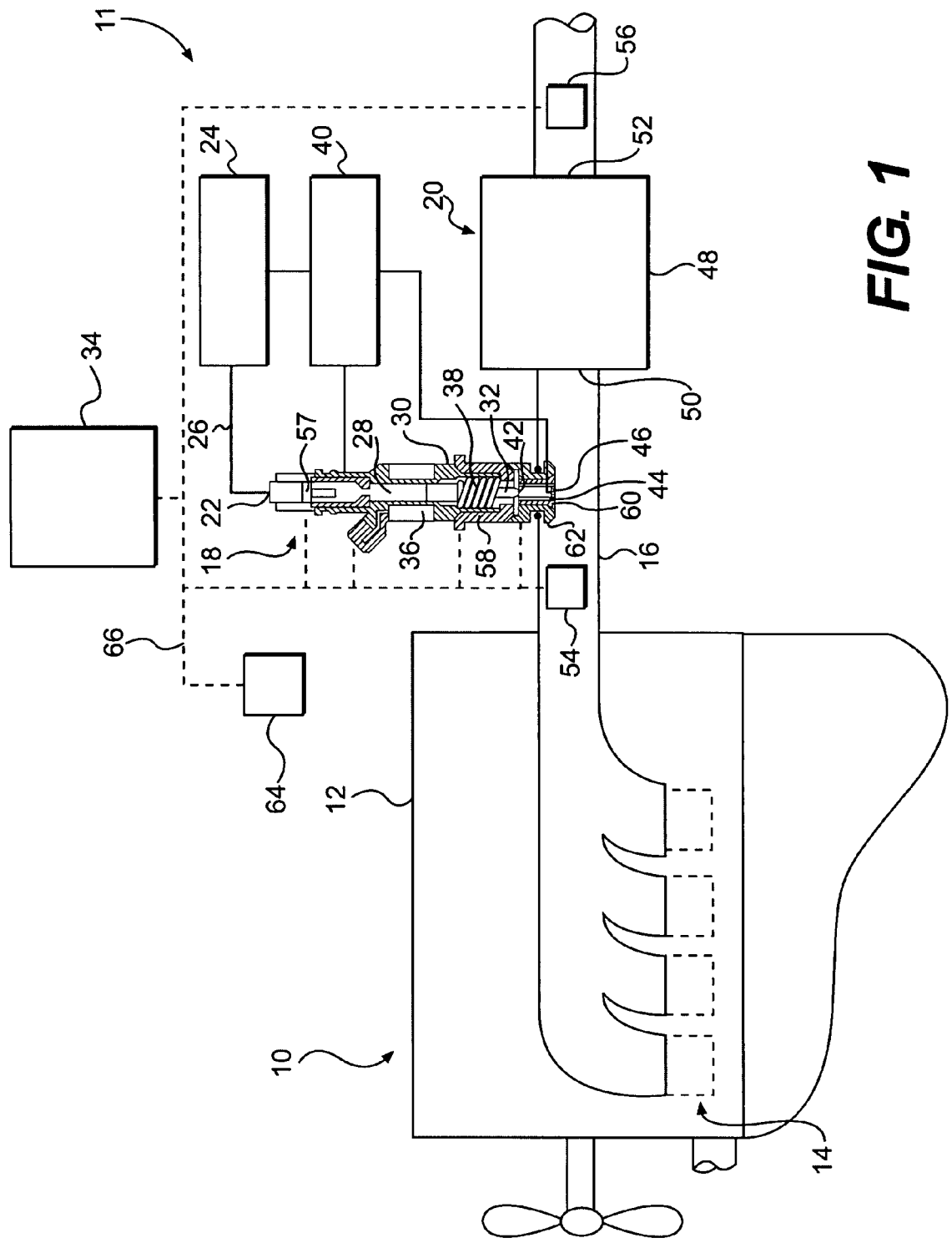
FIG. 1 is a schematic illustration of a power unit and an aftertreatment system, according to an exemplary embodiment of the present disclosure.

FIG. 1 illustrates a power unit 10 and an aftertreatment system 11. For the purposes of this disclosure, power unit 10 may include a four-stroke diesel engine. One skilled in the art may recognize, however, that power unit 10 may be any other type of internal combustion engine such as, for example, a gasoline or a gaseous fuel-powered engine. Power unit 10 may include an engine block 12 that may at least partially define a plurality of combustion chambers 14. In the illustrated embodiment, power unit 10 may include four combustion chambers 14. However, it is contemplated that power unit 10 may include a greater or lesser number of combustion chambers, and that combustion chambers 14 may be disposed in an "in-line" configuration, a "V" configuration, or any other suitable configuration.

Combustion chambers 14 may receive a combustible mixture of air, fuel, exhaust, and/or any suitable combination thereof from an intake manifold (not shown) of power unit 10. The air, fuel, and/or exhaust mixture may be compressed and combusted in combustion chambers 14 using a piston assembly (not shown) and other components that would be apparent to one skilled in the art. Exhaust gas and other byproducts of combustion may leave combustion chamber 14 and enter an exhaust passage 16. The exhaust gas and the other byproducts may flow in a fluid stream through exhaust passage 16.

The exhaust gas flowing through exhaust passage 16 may include a complex mixture of pollutants, including, for example, $NO_x$. Aftertreatment system 11 may use the SCR process to reduce the amount of $NO_x$ in the exhaust gas. During the process, a gaseous or liquid reducing agent, such as, for example, aqueous solutions of ammonia or urea, may be injected into exhaust passage 16 by a reducing agent injector 18. The exhaust gas and reducing agent mixture may then be absorbed by a catalyst 20 downstream from reducing agent injector 18. At catalyst 20, the reducing agent may react with NO$_x$ in the exhaust gas to produce water and nitrogen gas, thus reducing the NO$_x$ level in the exhaust gas.

Reducing agent injector 18 may receive at an inlet 22 a supply of reducing agent from a reducing agent source 24, such as, for example, a storage tank or reservoir. Reducing agent source 24 may direct the reducing agent into reducing agent injector 18 using a passage 26 fluidly connecting reducing agent injector 18 with reducing agent source 24. The reducing agent may be stored in one or more passages 28 in a body 30 of reducing agent injector 18. Body 30 may include a generally cylindrical member whose walls may define one or more passages.

Reducing agent injector 18 may also include a plunger 32 slidably received within body 30. Plunger 32 may be biased into a closed position by a spring or similar biasing mechanism 38. When plunger 32 is in the closed position, plunger 32 may act as a barrier preventing the reducing agent from exiting from body 30. Upon receiving a signal from a controller 34, an actuator 36 coupled to plunger 32 may force plunger 32 into an open position against the biasing force exerted by biasing mechanism 38. When plunger 32 is in the open position, passage 28 may be placed in fluid communication with a nozzle 44 of reducing agent injector 18 by way of an outlet 42 body 30.

Actuator 36 may include a solenoid actuator assembly, a hydraulic actuator assembly, a mechanical actuator assembly, and/or any other suitable actuator assembly capable of overcoming the biasing force exerted on plunger 32 by biasing mechanism 38, to move plunger 32 into the open position. For example, actuator 36 may include an electronically controlled solenoid actuator assembly. When actuator 36 is energized, an electromagnet (not shown) may move plunger 32 to the open position. When actuator 36 is de-energized, biasing mechanism may return plunger to the closed position. Controller 34 may control when actuator 36 will be energized, and also how long actuator 36 may remain energized. The amount of reducing agent released from reducing agent injector 18 into exhaust passage 16 may increase as the period of time that actuator 36 is energized increases, and also as the frequency with which actuator 36 is energized increases.

Reducing agent source 24 may store pressurized reducing agent, and may supply the pressurized reducing agent to reducing agent injector 18. The pressure may assist with the atomization of the reducing agent at nozzle 44 when plunger 32 is withdrawn, since the reducing agent may be forced out of one or more small nozzle orifices 46 in nozzle 44 by the pressure. It is also contemplated that reducing agent source 24 and/or reducing agent injector 18 may be fluidly coupled to a pressurized air source 40. Pressurized air source 40 may provide reducing agent source 24 and/or reducing agent injector 18 with pressurized air to help atomize the reducing agent by forcing the reducing agent through nozzle orifices 46. Additionally or alternatively, pressurized air source 40 may introduce pressurized air at or near nozzle orifices 46 to help atomize the reducing agent exiting from nozzle orifices 46.

Nozzle 44 may extend at least partially into exhaust passage 16. Nozzle orifices 46 may be arranged on an end of nozzle 44 to direct the reducing agent from within nozzle 44 into exhaust passage 16 in directions approximately orthogonal to a longitudinal flow axis of exhaust passage 16. Nozzle orifices 46 may also be arranged circumferentially about nozzle 44 to direct the reducing agent from within nozzle 44 into exhaust passage 16 in directions approximately parallel to the longitudinal flow axis of exhaust passage 16. However, it is also contemplated that nozzle orifices 46 may be arranged to direct the reducing agent into exhaust passage 16 at any other angle. The type and number of nozzle orifices 46 may be selected to produce any suitable spray pattern. Injection of the reducing agent in this manner may help to ensure that the reducing agent is mixed substantially uniformly with the exhaust gas flowing within exhaust passage 16. Nozzle 44 may have a linear configuration, a curved configuration, a bent configuration, and/or any other suitable configuration. While it is contemplated that nozzle 44 may have any suitable length, in some instances, extending nozzle 44 into the center of exhaust passage 16 may be desirable to ensure substantially uniform mixing of the reducing agent with the exhaust gas in exhaust passage 16.

The mixture of the exhaust gas and reducing agent may flow toward catalyst 20. Catalyst 20 may include a housing 48 having an inlet 50 for receiving the mixture, and an outlet 52 for expelling exhaust, water, and nitrogen gas, after the reduction reaction has taken place. Catalyst 20 may be made from materials including, for example, platinum, vanadium, zeolites, and/or any other materials suitable for absorbing the mixture of the exhaust gas and reducing agent, and promoting the reduction reaction between the reducing agent and NO$_x$ in the exhaust gas.

Controller 34 may monitor and control the SCR process. Controller 34 may include a single microprocessor or multiple microprocessors. Numerous commercially available microprocessors can be configured to perform the functions of controller 34. It should be appreciated that controller 34 could readily embody a general power unit microprocessor capable of controlling numerous power unit functions. Various other known circuits may be associated with controller 34, including power supply circuitry, signal-conditioning circuitry, solenoid driver circuitry, communication circuitry, and other appropriate circuitry.

Controller 34 may be coupled to one or more sensors, including, for example, an upstream NO$_x$ sensor 54, a downstream NO$_x$ sensor 56, and a pressure sensor 57. Upstream NO$_x$ sensor 54 may be positioned pre-catalyst, that is, upstream from catalyst 20, while downstream NO$_x$ sensor may be positioned post-catalyst, that is, downstream from catalyst 20. Both upstream and downstream NO$_x$ sensors 54 and 56 may sense NO$_x$ levels in the exhaust gas at their respective locations. If the sensed NO$_x$ levels exceed some predetermined threshold amount, controller 34 may initiate processes designed to reduce the sensed NO$_x$ levels. For example, in response to signals from upstream and downstream NO$_x$ sensors 54 and 56 indicating the presence of excessive levels of NO$_x$ in the exhaust gas, controller 34 may inject more reducing agent, send an alert to a user or technician indicating that service may be required to bring NO$_x$ levels back down to or below threshold levels, and/or purge reducing agent injector 18. Pressure sensor 57 may be positioned in body 30 of reducing agent injector 18, in passage 26, in nozzle 44, or in any other suitable location for sensing pressure upstream from, downstream from, and/or at or near nozzle orifices 46. If the sensed pressure exceeds some predetermined threshold amount, controller 34 may initiate purging to clear any clogs or blockages in the system.

Purging may be beneficial, since one possible cause of rising NO$_x$ levels may be the formation of debris in and/or around nozzle 44. Debris may interfere with the flow of reducing agent traveling through nozzle and exiting into the exhaust gas. The debris may form over time as heat in exhaust passage 16 causes the aqueous reducing agent in nozzle 44 or around nozzle orifices 46 to evaporate, thus leaving solid reside behind. That solid residue may build up and eventually clog nozzle 44.

A heater 58 may be coupled to reducing agent injector 18 to help unclog a clogged nozzle, or to prevent nozzle 44 from clogging in the first place. Heater 58 may include a heating element 60 proximate to or in contact with one or more components of reducing agent injector 18, including, for example, nozzle 44. In one embodiment, heater 58 and/or heating element 60 may substantially surround nozzle 44. Heating element 60 may include a coil winding that may generate heat upon receiving current. Current may be supplied to heating element 60 from controller 34 or any other suitable source, causing the temperature of heating element 60 to increase. Heating element 60 may then be used to heat nozzle 44 to a temperature at which any debris clogging nozzle 44 or nozzle orifices 46 may be reduced by, for example, evaporation, incineration, burning, combustion, or any other suitable mechanism for removing the debris. The temperature may fall at or between 70 to 550° C. In one exemplary embodiment, a temperature of approximately 150° C. may be used. However, it should be understood that the temperature selected may vary depending on the environment in which nozzle 44 may be used. Heater 58 may also include a temperature sensor 62 configured to sense the temperature of heating element 60 and/or nozzle 44, and report data back to controller 34. Temperature sensor 62 may be coupled to heating element 60 and/or nozzle 44. It is also contemplated that heating element 60 may be in contact with nozzle 44 at or near nozzle orifices 46. By using the data from temperature sensor 62, controller 34 may determine when the desired temperature is achieved.

Controller 34 may selectively activate heater 58 upon receiving or recognizing one or more triggers. One trigger may be the presence of undesirable $NO_x$ levels in the exhaust gas, sensed by upstream $NO_x$ sensor 54 and/or downstream $NO_x$ sensor 56. Another trigger may be the presence of excess pressure in a location upstream from a blockage, as sensed by pressure sensor 57. Yet another trigger may be the lack of pressure downstream from a blockage, which may also be sensed by pressure sensor 57. Yet another trigger may be the passage of a predetermined interval of time, and/or any other suitable trigger or combination of triggers. Controller 34 may deactivate heater 58 when temperature sensor 62 signals to controller 34 that heating element 60 and/or nozzle 44 has reached a predetermined temperature, that heating element 60 and/or nozzle 44 has been held at the predetermined temperature for a predetermined length of time, such as, for example, at or between 3 to 5 minutes. Additionally or alternatively, controller 34 may deactivate heater 58 when pressure sensor 57 signals to controller 34 that pressure levels have been returned to some threshold amount, indicating that a clog or blockage has been cleared.

Controller 34 may keep track of time intervals using a timer 64. Timer 64 may include a digital or analog type device configured to indicate a time elapsed since a previous nozzle cleaning event, time remaining until a next nozzle cleaning event, time duration of a nozzle cleaning event, or any other similar time measurement. Timer 64 may generate a signal indicative of the time measurement and send this signal to controller 34 by way of a communication line 66.

Industrial Applicability

The fluid injector of the present disclosure may be applicable to a variety of exhaust treatment devices including, for example, SCR devices requiring the injection of urea or any other suitable reducing agent, and other similar devices known in the art. The disclosed injector may be implemented in any engine system that benefits from clog-free injector operation.

Referring to FIG. 1, an aqueous urea solution may be drawn into a reducing agent injector 18 for use in SCR. Specifically, the aqueous urea solution may be injected into exhaust passage 16 for mixing with the exhaust gas therein prior to being directed into catalyst 20, where the reduction reaction may be completed. Unfortunately, heat from the exhaust gas may evaporate the aqueous urea solution, causing a build up of solid material in and/or around nozzle 44. If left unchecked, the buildup could accumulate to a point significant enough to restrict, or even prevent, the injection of the aqueous urea solution into exhaust passage 16. This may hinder the reduction reaction and cause $NO_x$ levels in the exhaust gas to rise.

Nozzle 44 may be purged to clean nozzle 44 and/or nozzle orifices 46. Nozzle purging may be performed periodically, or more randomly on the basis of a triggering condition, such as, for example, an unexpected increase in pressure at or upstream from reducing agent injector 18, an unexpected increase in $NO_x$ levels in the exhaust gas, or any other undesirable condition.

Figure 2:
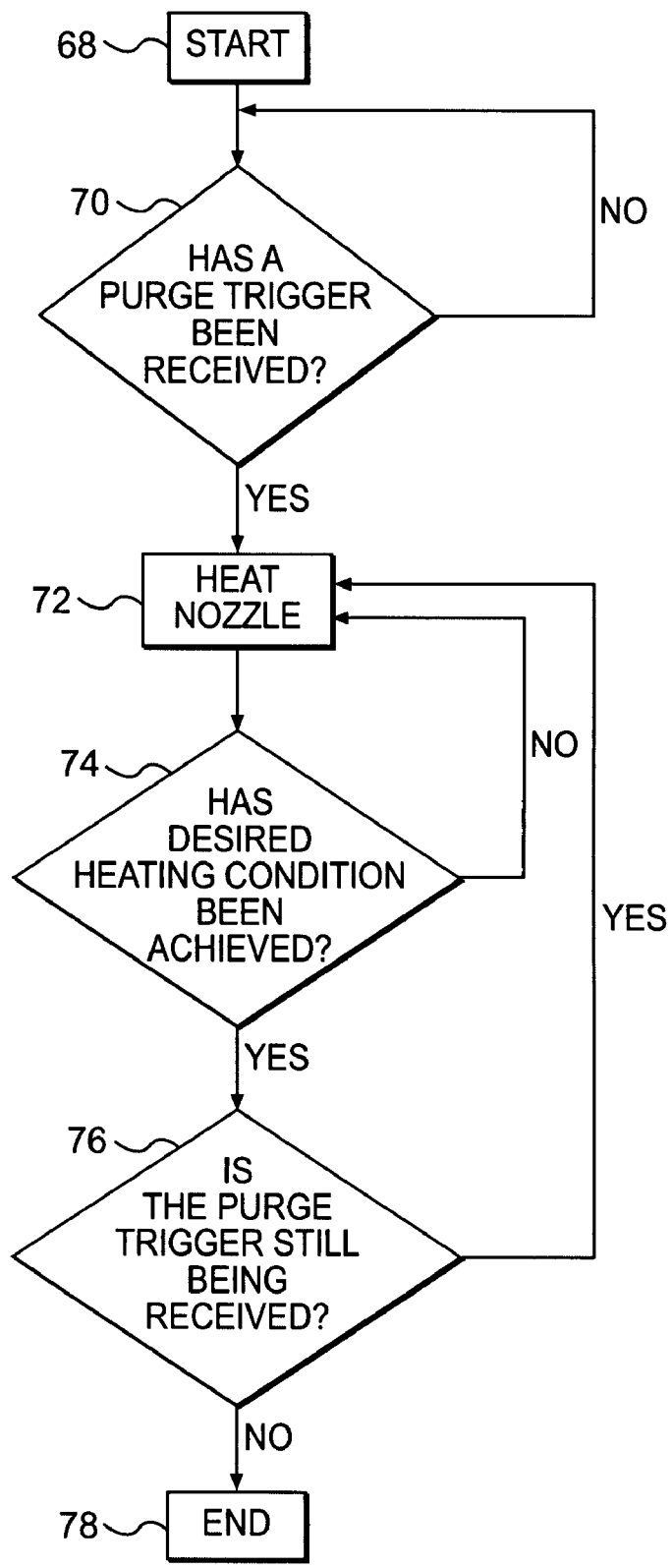
FIG. 2 is a flow diagram of a method for purging a reducing agent injector, according to an exemplary embodiment of the present disclosure.

One exemplary purge process is illustrated in the flowchart of FIG. 2. The purge process may start (Step 68) with controller 34 determining whether a purge trigger has been received or recognized (Step 70). If a purge trigger has not been received or recognized (NO), controller 34 may not initiate the purging process, but rather, may continue to monitor until it happens. If a purge trigger has been received or recognized (YES) by controller 34, the next step may include heating nozzle 44 with heater 58 (Step 72). Controller 34 may determine whether a desired heating condition has been achieved (Step 74). For example, nozzle 44 may be heated until controller 34 determines that its temperature reaches at or between approximately 70 to 550° C. for a length of time at or between approximately 3-5 minutes. Heating conditions may be selectively adjusted based on the characteristics of power unit 10, fuel combusted in power unit 10, the characteristics of aftertreatment system 11, the properties of the reducing agent, and/or any other suitable characteristic. If the desired heating condition has not been achieved (NO), heater 58 may continue to heat nozzle 44. If the desired heating condition has been achieved (YES), controller 34 may determine whether the purge trigger still exists (Step 76). If the purge trigger still exists (YES), controller 34 may heat nozzle 44 again. Once the purge trigger no longer exists (NO), the purging process may end (Step 78). It is contemplated that if the clog remains, a purge event requiring a higher temperature and/or heating duration may be employed. It is also contemplated that the purge process may be triggered manually from a cab of a vehicle by a vehicle operator.

The disclosed injector configuration may ensure continued and successful regeneration events by removing reducing agent buildup in an efficient manner. Specifically, by heating nozzle 44 of reducing agent injector 18, both residual liquids and solid buildup in nozzle 44 and/or nozzle orifices 46 may be efficiently burned away. By removing both the liquids and the solids, the successful operation of the disclosed injector may be prolonged. Further, because purging may be performed without physically removing reducing agent injector 18, the time and cost required for cleaning reducing agent injector 18 may be reduced.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A method of introducing a reducing agent into an exhaust stream, the method comprising:
   injecting the reducing agent into the exhaust gas stream using a reducing agent injector having a nozzle; and
   sensing residue on the nozzle based on a pressure level of the reducing agent upstream of the nozzle and within the reducing agent injector and exceeding a threshold pressure level;
   generating a triggering condition when the pressure level of the reducing agent exceeds the threshold pressure level; and
   selectively heating the nozzle of the reducing agent injector in response to the triggering condition to reduce the residue on the nozzle.

2. The method of claim 1, wherein heating the nozzle includes heating a portion of the nozzle having one or more nozzle orifices.

3. The method of claim 1, wherein heating the nozzle includes activating a heating element coupled to the nozzle.

4. The method of claim 1, wherein heating the nozzle includes bringing the nozzle to a temperature at which the residue is removed.

5. The method of claim 4, wherein heating the nozzle further includes keeping the nozzle at the temperature for a predetermined length of time.

6. A method for cleaning residue from a reducing agent injector of an aftertreatment system, the method comprising:
   sensing residue on a nozzle of the reducing agent injector based on a pressure level of a reducing agent upstream of the nozzle and within the reducing agent injector and being outside of a predetermined range;
   generating a triggering condition when the pressure level of the reducing agent falls outside of the predetermined range, the triggering condition being indicative of the presence of residue interfering with the injection of the reducing agent by the reducing agent injector;
   activating a heater in response to the triggering condition; and
   heating the nozzle of the reducing agent injector with the heater to remove the residue from the nozzle.

7. The method of claim 6, wherein heating the reducing agent injector includes heating until a heating condition is satisfied.

8. The method of claim 7, wherein heating until a heating condition is satisfied includes heating the nozzle to a predetermined temperature.

9. The method of claim 7, wherein heating until a heating condition is satisfied includes heating the nozzle for a predetermined length of time.

10. The method of claim 6, wherein the heater is automatically activated.

11. A system for performing selective catalytic reduction, the system comprising:
   a reducing agent injector including a nozzle and configured to inject a reducing agent into exhaust in an exhaust passage through the nozzle;
   a pressure sensor configured to sense a pressure level of the reducing agent upstream of the nozzle and within the reducing agent injector;
   a heater coupled to a nozzle of the reducing agent injector;
   a catalyst configured to receive a mixture of reducing agent and exhaust from the exhaust passage; and
   a controller coupled to the heater and the pressure sensor, the controller configured to activate the heater to remove residue from the nozzle based on an indication that residue has accumulated in the nozzle, wherein the indication is the sensed pressure level falling outside of a predetermined range.

12. The system of claim 11, wherein the heater substantially surrounds a portion of the nozzle.

13. The method of claim 6, wherein the heating step occurs when the nozzle has a temperature in the range of from about 150° C. to 550° C.

14. The method of claim 6, wherein the heating step occurs when the nozzle has a temperature in the range of 70° C. to about 150° C.

15. The system of claim 11, in which the nozzle has an orifice disposed in the exhaust passage and the reducing agent injector includes a body and a plunger slidably received within the body, the plunger moveable between an open position and a closed position in which the plunger covers the orifice of the nozzle, the plunger biased into the closed position.

* * * * *